D. C. BAUGHMAN.
Grain-Drill.
No. 57,068.
Patented Aug. 14, 1866.
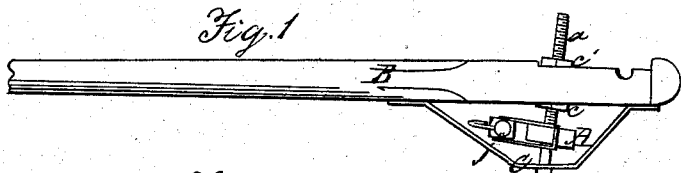
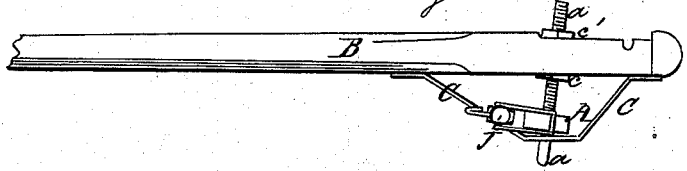
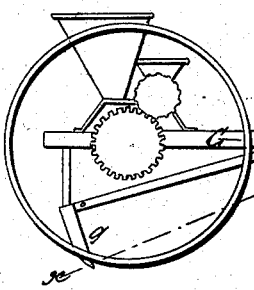
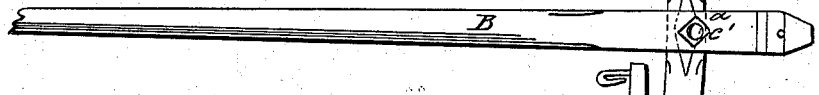
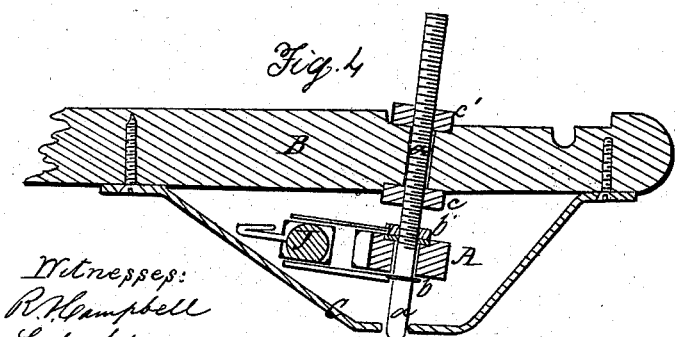

UNITED STATES PATENT OFFICE.

D. C. BAUGHMAN, OF TIFFIN, OHIO.

IMPROVED MODE OF HITCHING HORSES TO SEEDING-MACHINES.

Specification forming part of Letters Patent No. 57,068, dated August 14, 1866.

*To all whom it may concern:*

Be it known that I, D. C. BAUGHMAN, of Tiffin, in the county of Seneca and State of Ohio, have invented an Improved Mode of Hitching Horses to Seeding-Machines; and I do hereby declare that the following is a full, clear, and exact description thereof, reference being had to the accompanying drawings, making a part of this specification, in which—

Figure 1 is a side view, showing the mode of attaching the double-tree to the draft-pole. Fig. 2 is a similar view, showing the double-tree in a depressed position. Fig. 3 is a top view of the double-tree attached to the draft-pole. Fig. 4 is a vertical longitudinal section through the rear end of the draft pole or tongue and the double-tree attachment. Fig. 5 is a view of a seeding-machine, showing the operation of my invention.

Similar letters of reference indicate corresponding parts in the several figures.

This invention is intended to relieve teams drawing seeding-machines from the downward pressure of the draft tongue or pole, which is chiefly caused by not having the line of draft coincide with the resistance to be overcome.

The nature of my invention consists in applying the double-tree to the tongue or draft pole in such manner that it can be adjusted up or down by means of an inclined pin and set at any desired point with respect to the said tongue, so as to bring the line of draft in a line with the points of the seeding-machine teeth, said pin serving not only as a means for holding the double-tree in the desired position, but also as a pivot for said tree, as will be hereinafter described.

To enable others skilled in the art to understand my invention, I will describe its construction and operation.

Seeding-machines which have their draft-tongues attached to the frames at a point which is considerably above the points of the drill-teeth cause considerable downward draft upon the necks of the animals used to draw these machines. This difficulty results from having the line of draft so far above the points of resistance that the front end of the draft-tongue is forced downward and the animals caused to pull to a great disadvantage.

To remedy this difficulty I attach the double-tree A centrally to an adjustable rod, $a$, which passes loosely through the draft-tongue B near its rear end, and also through a brace, C, which is secured to the bottom of said tongue, as shown in Figs. 1, 2, and 4. The rod $a$ inclines forward, and the double-tree is attached to it by means of a fixed collar, $b$, and a nut, $b'$, which allow the double-tree to swing freely about the rod, but prevent it from moving up or down thereon.

That portion of the rod $a$ above the double-tree has screw-threads cut upon it for receiving the adjusting-nuts $c\ c'$ above and below the tongue B, by means of which nuts the rod $a$, with its double-tree, can be adjusted nearer to or farther from the tongue and secured in the desired position. The two nuts $c\ c'$, when set up tightly against the tongue, prevent the double-tree from moving upward or downward with its rod $a$, and the collar and nut prevent the double-tree from moving up or down on the rod $a$. The rod $a$ is supported at its lower end by the brace C in the inclined position indicated in the drawings, so that this rod will be nearly, if not quite, perpendicular to the line of draft when the machine is being drawn along and the drill-teeth offering resistance to the forward movement.

By reference to Fig. 5 the operation of my invention will be explained.

The tongue $b$ is bolted to the front part of the frame G of the seeding-machine. The double-tree A is provided with single-trees J J, to which the animals are hitched in the usual manner, the traces drawing from the hames or collars on the necks of the animals. The double-tree and single-trees are then adjusted to or from the tongue B by means of the nuts $c\ c'$ until the single-tree is in a plane coinciding with a line or with lines running from the points of the drill-teeth $g$ to the hitching-eyes on the hames, as indicated by red lines $x\ x$, Fig. 5.

By my invention the adjustment of the double-tree can be made without detaching it from the tongue of the machine.

Having thus described my invention, what I claim as new, and desire to secure by Letters Patent, is—

1. Pivoting the double-tree A to an inclined rod, $a$, which is supported at its upper and lower ends and made adjustable in a direction with its length, substantially as described.

2. The adjustable screw-rod $a$, having the double-tree pivoted to it and provided with adjusting set-screws $c\ c'$, and a lower brace, C, substantially as described.

D. C. BAUGHMAN.

Witnesses:
 DAVID J. GOODSELL,
 R. M. BOYER.